United States Patent
Dudami et al.

(10) Patent No.: US 10,846,307 B1
(45) Date of Patent: Nov. 24, 2020

(54) SYSTEM AND METHOD FOR MANAGING INTERACTIONS WITH A DATA LAKE

(71) Applicant: CSG Systems, Inc., Greenwood Village, CO (US)

(72) Inventors: Prashant Dudami, Toronto (CA); Dharmesh S. Mistry, Downers Grove, IL (US); Ahmed Mohiuddin, Downers Grove, IL (US)

(73) Assignee: CSG Systems, Inc., Greenwood Village, CO (US)

( * ) Notice: Subject to any disclaimer, the term of this patent is extended or adjusted under 35 U.S.C. 154(b) by 0 days.

(21) Appl. No.: 16/839,225

(22) Filed: Apr. 3, 2020

(51) Int. Cl.
| | |
|---|---|
| *G06F 16/28* | (2019.01) |
| *G06F 16/2457* | (2019.01) |
| *G06F 16/182* | (2019.01) |
| *G06F 16/16* | (2019.01) |
| *G06F 16/23* | (2019.01) |

(52) U.S. Cl.
CPC .......... *G06F 16/283* (2019.01); *G06F 16/168* (2019.01); *G06F 16/182* (2019.01); *G06F 16/2358* (2019.01); *G06F 16/24573* (2019.01)

(58) Field of Classification Search
CPC ..................................... G06F 16/283
USPC ....................................... 707/803
See application file for complete search history.

(56) References Cited

U.S. PATENT DOCUMENTS

| 6,760,727 | B1* | 7/2004 | Schroeder | G06Q 30/02 |
| 2003/0004818 | A1* | 1/2003 | Hoffman | G06Q 30/0617 |
| | | | | 705/26.43 |
| 2015/0199352 | A1* | 7/2015 | Bush | G06F 16/211 |
| | | | | 707/745 |
| 2017/0004312 | A1* | 1/2017 | Agarwal | H04L 63/20 |
| 2018/0314734 | A1* | 11/2018 | James | G06F 16/24542 |
| 2020/0104171 | A1* | 4/2020 | Theimer | G06F 9/50 |

* cited by examiner

*Primary Examiner* — Syling Yen
(74) *Attorney, Agent, or Firm* — Fitch, Even, Tabin & Flannery LLP

(57) ABSTRACT

Metadata elements are created and validated. Once the metadata element is validated it is applied to raw incoming data. If a match is obtained, then the raw data is sent to a designated storage structure. When there is no match, then the raw data is sent to a data structure designated for unorganized raw data.

14 Claims, 4 Drawing Sheets

SYSTEM AND METHOD FOR MANAGING INTERACTIONS WITH A DATA LAKE

TECHNICAL FIELD

This disclosure relates to managing interactions with a data lake.

BACKGROUND

A data lake is a data repository that stores large amounts of raw data in the native format of the raw data until the data is needed. Data lakes are structures that typically hold large amounts of data. Since the data is unorganized, it is difficult sometimes to efficiently retrieve and perform operations on the data.

BRIEF DESCRIPTION OF THE DRAWINGS

For a more complete understanding of the disclosure, reference should be made to the following detailed description and accompanying drawings wherein.

DETAILED DESCRIPTION

Figure 1:
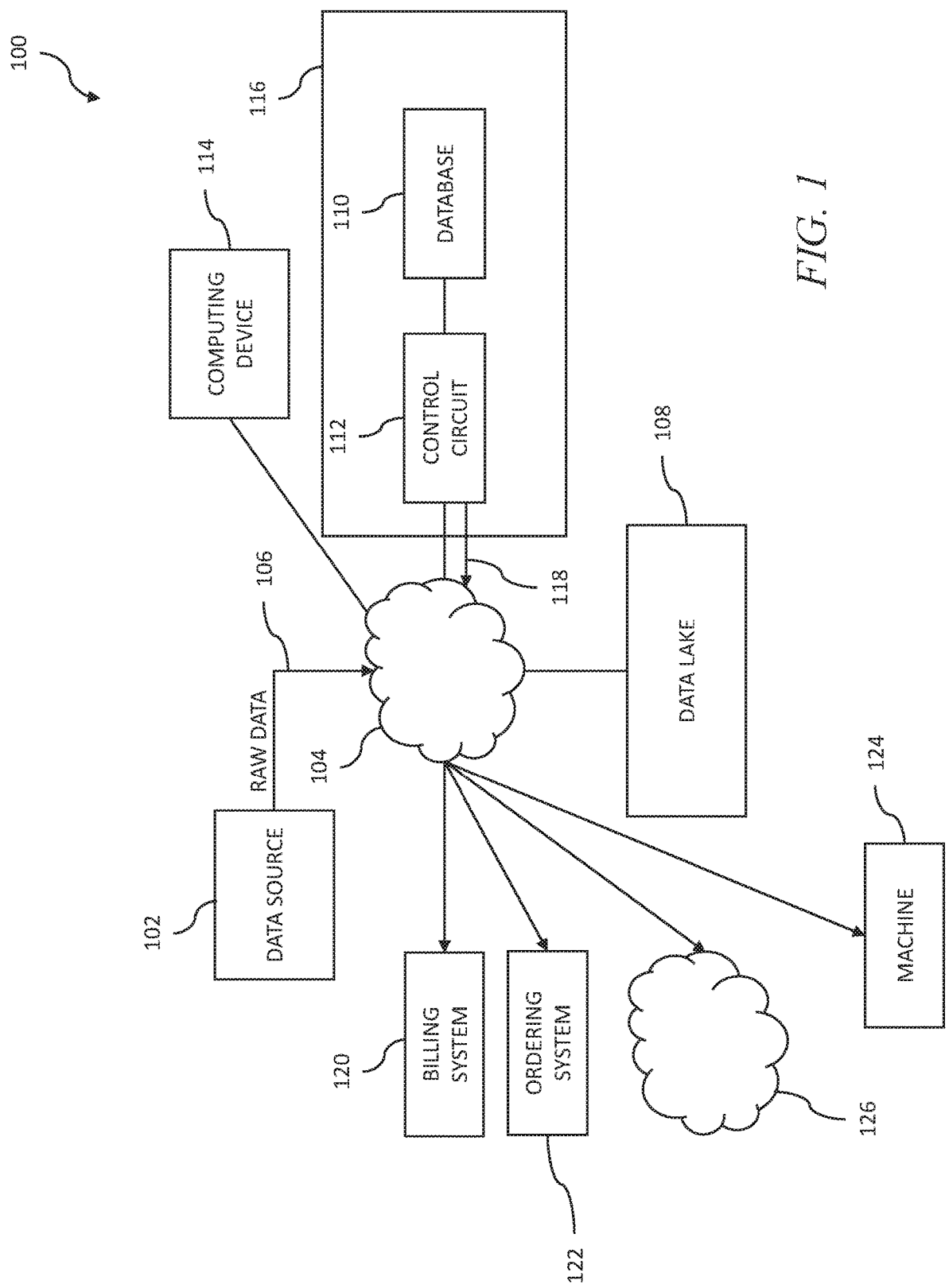
FIG. 1 comprises a diagram of a system as configured in accordance with various embodiments of these teachings.

Generally speaking, approaches are provided where a metadata element is created, which contains parameters leveraged by rules and this metadata element is validated against expected values. Raw data is received and the metadata element is applied to the raw data. If there is a match, the raw data is placed into a first electronic structure (e.g., an electronic folder), and if no match is made, the data is placed into a second storage structure (where "unorganized" data is placed). A second metadata element is subsequently created. This second metadata element is applied to the second storage structure (the "unorganized" structure) to see if there are matches. Eventually, the raw data is analyzed and various physical actions can occur.

In many of these embodiments, a first metadata element is created. The first metadata element is validated by a applying a set of rules to the first metadata element. The rules are stored in an electronic database, and the rules specify that the first metadata element must include a partitioning approach.

After the first metadata element has been validated, raw data is obtained from at least one data source. When the first metadata element matches the raw data, the raw data is streamed into a first data storage structure in a data lake. When the first metadata element does not match the raw data, the raw data is streamed into a second data storage structure in the data lake, the second data storage structure being designated to hold all unmatched data. The raw data in the first data storage structure is analyzed and an action is performed based upon the analyzing. The action is one of: sending a bill to a client, ordering a part from a manufacturer or supplier, sending a control signal that controls a manufacturing process, or switching or altering the operation of elements in an electronic network. Other examples of actions are possible.

Subsequently, a second metadata element is created and the second metadata element is applied to the raw data stored in the second data storage structure. When the applying obtains a match between the second metadata element and the raw data stored in the second data storage structure, at least some of the data in the second data storage structure is moved into a third data storage structure.

In aspects, the first metadata element is subsequently modified by a user.

In other examples, the first data storage structure and the second data storage structure are electronic folders.

In other examples, a summary is included with the first metadata element. In aspects, the summary states a number of orders of a product type.

In still other examples, data in the first data storage structure is consumed by end applications. In still other examples, the partitioning approach relates to whether the data is time series data, a data identifier, or a data type. Other examples are possible.

In others of these embodiments, a system streams and routes data to locations in a data lake. The system includes an electronic communication network, an electronic data source that transmits raw data across the electronic communication network, a data lake coupled to the electronic communication network, an electronic database, a control circuit, and an electronic computing device.

The control circuit is disposed at a central location and is coupled to the electronic communication network and the electronic database. The electronic computing device includes a user interface and is coupled to the electronic communication network. The user interface accepting user instructions that create a first metadata element.

The control circuit is disposed at the central location and is configured to create the first metadata element according to the instructions; validate the first metadata element by applying a set of rules stored at the electronic database to the first metadata element, wherein the rules specify that the first metadata element must include a partitioning approach; after the first metadata element has been validated, obtain raw data from the electronic data source; when the first metadata element matches the raw data, stream the raw data into a first data storage structure in the data lake; when the first metadata element does not match the raw data, stream the raw data into a second data storage structure in the data lake, the second data storage structure being designated to hold all unmatched data; subsequently create a second metadata element and apply the second metadata element to the raw data stored in the second data storage structure, and when the applying obtains a match between the second metadata element and the raw data stored in the second data storage structure, move at least some of the data in the second data storage structure into a third data storage structure; and analyze the raw data in the first data storage structure and perform an action based upon the analyzing. The action is one of: creating and sending a bill to a client, ordering a part from a manufacturer or supplier, sending a control signal that controls a manufacturing process, or switching or altering the operation of elements in a second electronic communication network. Other examples of actions are possible.

Referring now to FIG. 1, one example of a system 100 that streams and routes data to storage structures in a data lake is described. The system 100 includes an electronic communication network 104, an electronic data source 102 that transmits raw data 106 across the electronic communication network 104, a data lake 108 coupled to the electronic communication network 104, an electronic database 110, a control circuit 112, and an electronic computing device 114.

The electronic data source 102 may be a variety of different devices that collect, process, measure, or otherwise obtain the raw data 106. In one example, the source 102 may be an electronic switch (that obtains usage information such as how, when, and for what purpose an electronic switch in an electronic network is utilized), an order-taking system (e.g., an electronic system that receives electronic orders from customers that includes, in examples, electronic devices, interfaces, and computer processors), and a transaction processing system (an electronic system that records electronic transactions associated with customers that includes, in examples, electronic devices, interfaces, and computer processors). Other examples are possible.

The control circuit 112 is disposed at a central location 116 and is coupled to the electronic communication network 104 and the electronic database 110.

The communication network 104 is any type of electronic communication network or combination of networks such as the internet, a cellular network, a wireless network, a wide area network, and/or a local area network, to mention a few examples. The electronic database 110 is any type of electronic memory storage device.

The electronic computing device 114 may be any type of electronic device such as a laptop, personal computer, smart phone, cellular phone, or tablet to mention a few examples. The electronic computing device 114 includes a user interface (e.g., a touch screen, keypad, computer mouse, to mention a few examples) and is coupled to the electronic communication network 104. The user interface of the computing device 114 accepts user instructions that create a first metadata element.

As described herein, various metadata elements are created. In one form, the metadata elements specify one or more rules, operating procedures, processing guidelines, or identification information to mention a few examples. In one example, the metadata element includes various identification fields (e.g., an order-type metadata element may include a subscriber ID field, an order type field, and an order items field, and also specify a data partitioning approach. The metadata elements are implemented as an electronic data structures that can be physically changed or modified. Various types of data structures having different formats can be utilized. As described elsewhere herein, the system determines whether a metadata element matches incoming raw data.

The control circuit 112 is disposed at the central location 116. The central location 116, in aspects, may be a company headquarters or other central processing location. The central location 116 may be a different physical location than the physical geographic location of the computing device 114 or the data lake 108.

The data lake 108 is a data repository that stores large amounts of raw data in the native format of the raw data until that data is needed by other entities, for example, for processing. The data lake 108 may include one or more electronic data storage devices and/or structures that hold the raw data. The data lake 108 may include various storage or organizational structures such as electronic file structures. To take one example, customer orders, transaction records, customer feedback, and information from electronic switches all have different formats and are received from different electronic sources. The data lake stores this incoming raw data as is, without altering the data. In aspects, the data lake 108 may be considered a "flat" data structure.

The term "control circuit" refers broadly to any one (or more) microcontrollers, computers, or processor-based devices with processors, memories, and programmable input/output peripherals, which are generally designed to govern the operation of other components and devices. It is further understood to include common accompanying accessory devices, including memory, transceivers for communication with other components and devices, etc. These architectural options are well known and understood in the art and require no further description here. The control circuit 112 may be configured (for example, by using corresponding programming stored in a memory as will be well understood by those skilled in the art) to carry out one or more of the steps, actions, and/or functions described herein.

The control circuit 112 is configured to create the first metadata element according to the instructions received from the computing device 114. The control circuit 112 then validates the first metadata element by applying a set of rules stored at the electronic database 110 to the first metadata element. In aspects, the rules specify that the first metadata element must include a partitioning approach. Other rules may also be applied to validate the first metadata element. If the validation fails, then the first metadata element is not used or applied to the incoming raw data. It will be appreciated that various metadata elements can be created and applied to the incoming raw data.

After the first metadata element has been validated, the control circuit 112 obtains raw data from the electronic data source 102. By raw data, it is meant data in its native format that has not been transformed into a different format.

When the first metadata element matches the raw data 106, the raw data 106 is streamed into a first data storage structure in the data lake 108. By "match," it is meant whether the incoming raw data 106 has all that is required (e.g., all the required fields, elements, or identifiers) by the metadata. For instance, an order may include a subscriber ID field, an order type field, and an order items field. The metadata may define an order to include a subscriber ID field, an order type field, and an order items field. Consequently, when an order (raw data 106) arrives at the control circuit, it matches the metadata. In this example, the metadata may also specify a data partitioning approach (e.g., partition by ID or just keep the latest information).

When the first metadata element does not match the raw data 106, the control circuit 112 streams the raw data 106 into a second data storage structure in the data lake 108. The second data storage structure is designated to hold all unmatched data. In one example, the storage structure is one or more electronic data folders.

Subsequently, the second metadata element is created by the computing device 114, which is validated by the control circuit 112. In some aspects, similar to the first metadata element, the second metadata element is also validated. When the applying obtains a match between the second metadata element and the raw data stored in the second data storage structure, the control circuit 106 moves at least some of the data in the second data storage structure into a third data storage structure.

The control circuit 112 analyzes the raw data in the first data storage structure and performs an action based upon the analyzing. The action is one of: creating and sending a bill to a client (e.g., by sending a control signal 118 to electronic billing system 120, where the electronic billing system 120 generates bills that are emailed or physically sent to customers), ordering a part from a manufacturer or supplier (e.g., by sending the control signal 118 to a manufacturing order system, which receives orders and instigates the physical sending of parts or components to users), by sending the control signal 118 to control a manufacturing process (e.g., the control signal activating a machine 124, deactivating the machine 124, or altering the operational speed of the machine 124 to mention a few examples), or transmitting the control signal 118 to an electronic switch or other electronic element to alter the operation of elements in a second electronic communication network 126. Other examples of actions are possible. It will be appreciated that these actions physically transform system elements.

In the approaches described herein metadata is applied to incoming raw data 106 before the raw data 106 reaches the data lake 108. The raw data 106 is organized before it reaches the data lake. This is the opposite of previous approaches where the data is first collected in the data lake and then organized. Since the raw data 106 that matches metadata elements has been organized before it enters the data lake, further ordering or reorganization of the matched data within the lake after the data enters the lake is not required. This is more efficient and allows the data to be used more quickly to perform follow-through actions as described elsewhere herein.

In other aspects, the first metadata element is subsequently modified by a user, for example, from the computing device 114.

In other examples, a summary is included with the first metadata element. In one example and when the first data element is of an "order" type, the summary states a number of orders of a product type. In another example, all orders that are time series orders are summarized and the summary can include the date received, the type, the status of the order, and the type of product. Other summary information is possible. The summary information can, in aspects, be placed in the first metadata element. Placement in the first metadata element ensures that users can quickly obtain and utilize the summary information. For instance, the summary information can be utilized to take actions as described elsewhere herein. The summary information in the metadata element dynamically changes over time as new raw data is processed by the control circuit 112 to determine whether matches exist. Thus, and in aspects, the summary information is always up-to-date.

In still other examples, the metadata element includes a partitioning approach and the partitioning approach relates to whether the data is time series data, a data identifier, or a data type. Other examples are possible.

Figure 2:
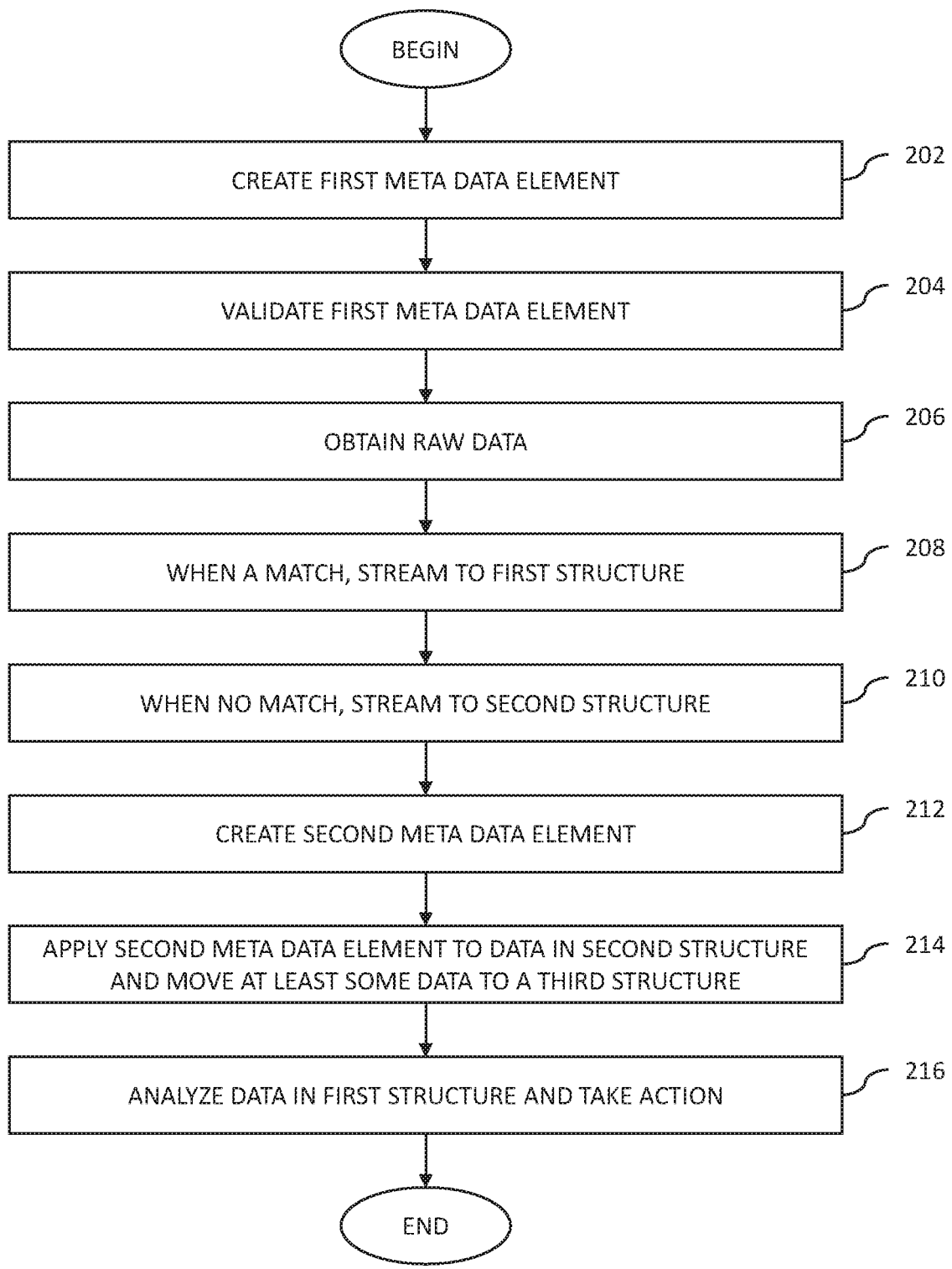
FIG. 2 comprises a flowchart as configured in accordance with various embodiments of these teachings.

Referring now to FIG. 2, one example of streaming data into a data lake is described.

At step 202, a first metadata element is created. In examples, the first metadata element is created by a user at an electronic user device. Various software tools can be used to create the element.

At step 204, the first metadata element is validated by a applying a set of rules to the first metadata element. The rules are stored in an electronic database, and the rules specify that the first metadata element must include a partitioning approach or must contain some other informational element.

At step 206 and after the first metadata element has been validated, raw data is obtained from at least one data source. The data source can be a variety of different electronic sources such as an automated ordering system or a piece of electronic equipment such as an electronic switch. The raw data may be communicated to a central location where some or all of the subsequent steps may be performed.

At step 208 and when the first metadata element matches the raw data, the raw data is streamed into a first data storage structure in a data lake. In examples, the first storage structure is an electronic folder. The data is not altered in the streaming process to the first data storage structure.

At step 210 and when the first metadata element does not match the raw data, the raw data is streamed into a second data storage structure in the data lake. The second data storage structure is designated to hold all unmatched data. An electronic label may identify the second data storage structure as including unmatched data. The data is not altered as it is moved into the second data storage structure.

Subsequently and at step 212, a second metadata element is created and the second metadata element is applied to the raw data stored in the second data storage structure. The second metadata element may also be validated as described above.

At step 214 and when the applying obtains a match between the second metadata element and the raw data stored in the second data storage structure, at least some of the data in the second data storage structure is moved into a third data storage structure. In this way, unmatched data can be further organized after the data has been placed in the data lake. Different schedules can be used to process the unmatched data, such as times of the data where low amounts of raw data arrive at the system.

At step 216, the raw data in the first data storage structure is analyzed and an action is performed based upon the analyzing. The action may be one of: sending a bill to a client, ordering a part from a manufacturer or supplier, sending a control signal that controls a manufacturing process, or switching or altering the operation of elements in an electronic network. Other examples of actions are possible.

Figure 3:
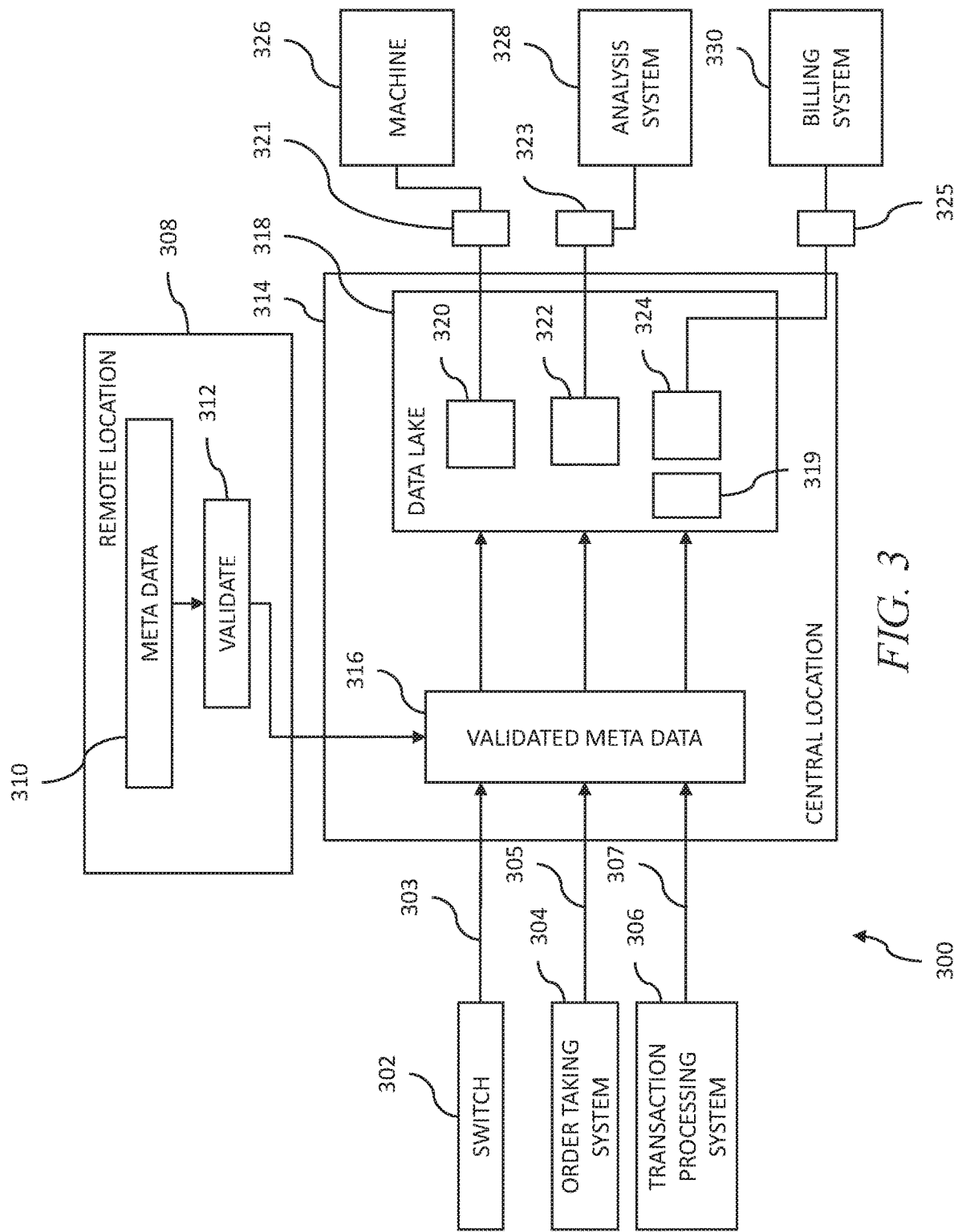
FIG. 3 comprises a flow diagram as configured in accordance with various embodiments of these teachings.

Referring now to FIG. 3, another example of a data streaming approach to a data lake is described. A system 300 includes an electronic switch 302, an order taking system 304, a transaction processing system 306, a remote location 308 (where metadata 310 is validated at step 312), a central location 314 (where validated metadata 316 is applied to incoming raw data 303, 305, and 307 to be placed in various electronic storage structures 320, 322, and 324 within a data lake 318), a machine 326, an analysis system 328, and a billing system 330.

The electronic switch 302 may be included within and function as an element of an electronic communication network and produces the raw data 303, which may include switch positions, customer usage of the switch, times of use, and other data.

The order taking system 304 receives customer orders from customers and formats these orders into the raw data 305. The transaction processing system 306 records customer transactions (e.g., inquiries, feedback, orders, or returns) and includes this information in the raw data 307. The elements 302, 304, and 306 can be owned or controlled by any suitable entity such as manufacturers, retailers, individuals, companies, or schools, and may be controlled or owned by the same or different ones of these entities.

The remote location 308 (where metadata 310 is validated at step 312) is any location that is physically or geographically remote from the central location 314. In one example, the central location is a company headquarters. As described elsewhere herein, the metadata includes fields (e.g., a customer identification field, product type field, and a product identifier and also, in aspects specifies further requirements such as a partitioning approach). The partitioning approach specifies how matched data is to be handled, e.g., simply placed in the data lake in time series order or some other organizational pattern or structure.

The metadata 310 is validated as described elsewhere herein. Once the metadata is validated, the validated metadata 316 is applied to incoming raw data 303, 305, and 307 to be placed in various electronic storage structures 320, 322, and 324 within a data lake 318).

The machine 326 is any type of industrial machine used in any type of industrial process. The machine 326 is coupled to data storage structure 320. Interface 321 (e.g., a control circuit) may obtain data from the structure 320, and determine an action to take, for example creating control signals to control the machine 326.

The analysis system 328 may include analytics that analyze data and create reports for users or customers such that further actions can be taken. The analysis system 328 is coupled to data storage structure 322. Interface 323 (e.g., a control circuit) may obtain data from the structure 322, and determine an action to take, for example creating control signals to cause the analysis system 328 to generate a report and cause some other action to occur.

The billing system 330 is any type of billing system that obtains information and creates customer bills. The billing system 330 is coupled to data storage structure 324. Interface 325 (e.g., a control circuit) may obtain data from the structure 324, and determine an action to take, for example, creating control signals to cause the billing system 330 to generate a customer bill.

It will be appreciated that the functions implemented at the central location 314, the remote location 308, and the interfaces 321, 323, and 325, may be implemented by various control circuits. It will also be appreciated that although in this example the machine 326, analysis system 328, and billing system 330 utilize information from single ones of the data storage structures 320, 322, and 324, the machine 326, analysis system 328, and billing system 330 may use or access information from multiple structures as well.

In operation and as described elsewhere herein, a first metadata element is created (e.g., element 310). The first metadata element is validated by a applying a set of rules to the first metadata element to create the validated metadata element 316. The rules may be stored in an electronic database (not shown in FIG. 3), and the rules specify that the first metadata element must include a partitioning approach.

After the first metadata element has been validated, raw data 303, 305, and 307 is obtained from sources 302, 304, and 306. When the validated metadata element 316 matches the raw data, the raw data is streamed into one of the data storage structures 320, 322, and 324 in the data lake 318. When the validated metadata element 316 does not match the raw data 303, 305, and 307, the raw data is streamed into an "unmatched" data storage structure 319 in the data lake 318.

Subsequently, a second metadata element is created and the second metadata element is applied to the raw data stored in the data storage structure 319. When the applying obtains a match between the second metadata element and the raw data stored in the data storage structure 319, at least some of the data in the second data storage structure is moved into one of the storage structures 320, 322, or 324 (depending upon which structure matches).

The raw data in the data storage structures 320, 322, and 324 is utilized by one (or more) of the elements 326, 328, or 330 and actions are performed.

Figure 4:
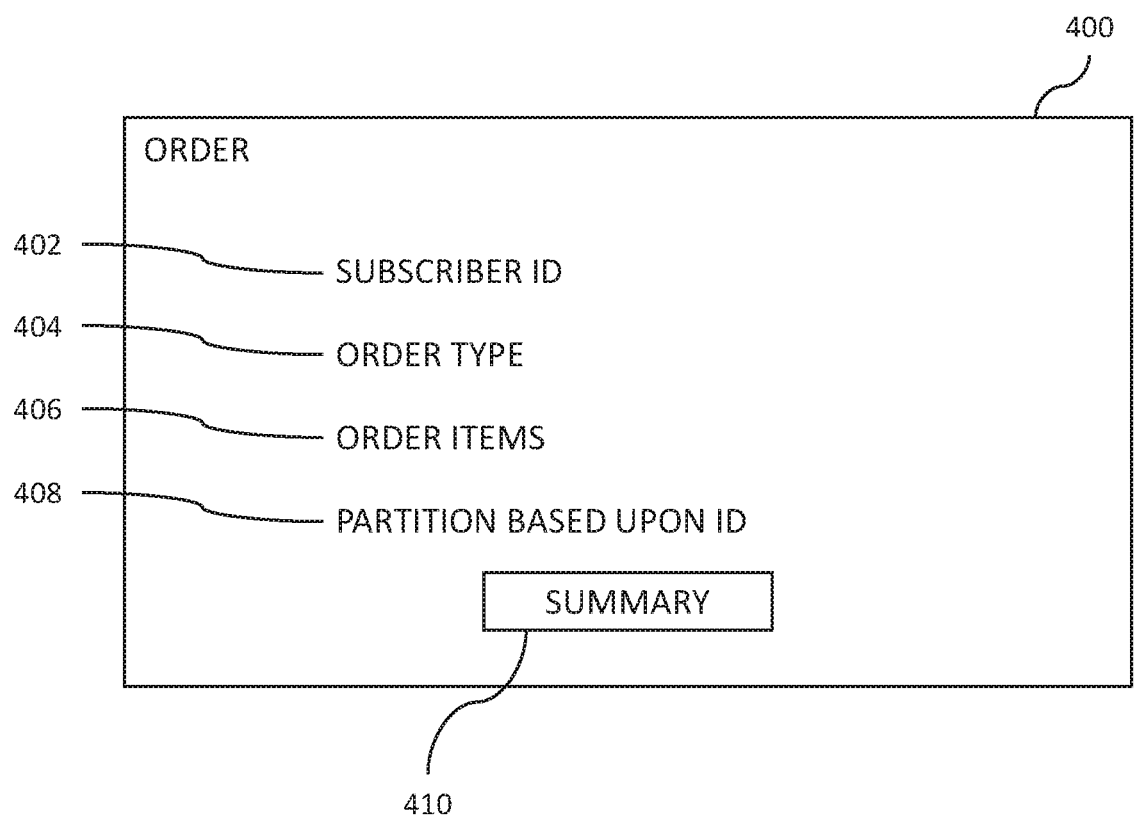
FIG. 4 comprises a diagram as configured in accordance with various embodiments of these teachings.

Referring now to FIG. 4, one example of a metadata element 400 is described. The metadata element 400 is an "order" type. The metadata element 400 includes a subscriber identifier (ID) field 402, an order type field 404, an order items field 406, and a partitioning approach 408 (in this case, partition based upon customer ID). The element 400 may be implemented as any appropriate data structure, computer code, or combination of these or other electronic elements.

In this example, the metadata element also includes a summary 410. In one example, the summary 410 indicates how many products of a certain product type have been ordered.

It will be appreciated that the metadata element 400 is applied to raw data as the raw data is received. The summary in the element 400 can automatically be updated in real-time as the raw data is received and before the data is placed in the data lake.

When matches exist between the element 400 and raw data, the raw data may be partitioned as indicated. By partitioning, the matched raw data can be placed in one or more identified electronic data structures in the data lake. For instance, for raw data that match (as orders), customers having an ID within a first range may be placed in a first data storage structure within the data lake. Customers having an ID within a second range have their orders placed within a second data storage structure within the data lake.

Subsequently, other entities can use the information in the data structures to perform actions. In this example, a billing system can use the information in the first and second data storage structures to create bills. A manufacturing system can utilize the information to control machines that create the products in a manufacturing facility. Other examples are possible.

Preferred embodiments of this disclosure are described herein, including the best mode known to the inventor(s). It should be understood that the illustrated embodiments are exemplary only and should not be taken as limiting the scope of the appended claims.

What is claimed is:

1. A method for routing data to locations in a data lake, the method comprising:

maintaining a data lake, the data lake comprising unorganized raw data that is in a native format;

creating a first metadata element and validating the first metadata element by applying a set of rules to the first metadata element, the rules being stored in an electronic database, wherein the rules specify that the first metadata element must include identification of a partitioning approach and the validation ensures that the first metadata element identifies a partitioning approach;

after the first metadata element has been validated, obtaining raw data from at least one data source before the raw data enters the data lake;

comparing the first metadata element to the raw data to determine matched raw data, the first metadata element having first fields, the raw data having second fields, the matched raw data being identified when all of the second fields are included within the first fields;

wherein the partitioning approach specifies streaming the matched raw data to a first data storage structure within the data lake;

at a first time selectively streaming the matched raw data into the first data storage structure in the data lake;

at a second time selectively streaming the raw data that is not matched into a second data storage structure in the data lake, the second data storage structure being designated to hold all unmatched data;

subsequent to the first time and the second time, creating and validating a second metadata element that is different from the first metadata element and applying the second metadata element to the raw data stored in the second data storage structure, and when the applying obtains a match between the second metadata element and the raw data stored in the second data storage structure, move at least some of the data in the second data storage structure into a third data storage structure;

analyzing the raw data in the first data storage structure and performing an action based upon the analyzing, the action being one of: sending a bill to a client, ordering a part from a manufacturer or supplier, sending a first control signal that controls a manufacturing process, sending a second control signal to a device, or switching or altering the operation of elements in an electronic network.

2. The method of claim 1, wherein the first metadata element is subsequently modified by a user.

3. The method of claim 1, wherein the first data storage structure and the second data storage structure are folders.

4. The method of claim 1, wherein a summary is included with the first metadata element.

5. The method of claim 4, wherein the summary states a number of orders of a product type.

6. The method of claim 1, wherein data in the first data storage structure is consumed by end applications.

7. The method of claim 1, wherein the partitioning approach relates to: whether the data is time series data, a data identifier, or a data type.

8. A system that streams and routes data to locations in a data lake, the system comprising:

an electronic communication network;

an electronic data source that transmits raw data across the electronic communication network;

a data lake coupled to the electronic communication network, the data lake comprising unorganized raw data that is in a native format;

an electronic database;

a control circuit, the control circuit being disposed at a central location and coupled to the electronic communication network and the electronic database;

an electronic computing device that includes a user interface, the electronic computing device coupled to the electronic communication network, the user interface accepting user instructions that create a first metadata element;

wherein the control circuit at the central location is configured to:

create the first metadata element according to the instructions;

validate the first metadata element by applying a set of rules stored at the electronic database to the first metadata element, wherein the rules specify that the first metadata element must include identification of a partitioning approach and the validation ensures that the first metadata element identifies a partitioning approach;

wherein the partitioning approach specifies streaming the matched raw data to a first data storage structure within the data lake;

compare the first metadata element to the raw data to determine matched raw data, the first metadata element having first fields, the raw data having second fields, the matched raw data being identified when all of the second fields are included within the first fields;

after the first metadata element has been validated, obtain raw data from the electronic data source before the raw data enters the data lake;

at a first time selectively stream the matched raw data into the first data storage structure in the data lake;

at a second time selectively stream the raw data that is not matched into a second data storage structure in the data lake, the second data storage structure being designated to hold all unmatched data;

subsequent to the first time and the second time, create and validate a second metadata element that is different from the first metadata element and apply the second metadata element to the raw data stored in the second data storage structure, and when the applying obtains a match between the second metadata element and the raw data stored in the second data storage structure, move at least some of the data in the second data storage structure into a third data storage structure;

analyze the raw data in the first data storage structure and performing an action based upon the analyzing, the action being one of: creating and sending a bill to a client, ordering a part from a manufacturer or supplier, sending a first control signal that controls a manufacturing process, sending a second control signal to a device, or switching or altering the operation of elements in an second electronic communication network.

9. The system of claim 8, wherein the first metadata element is subsequently modified by a user.

10. The system of claim 8, wherein the first data storage structure and the second data storage structure are folders.

11. The system of claim 8, wherein a summary is included with the first metadata element.

12. The system of claim 11, wherein the summary states a number of orders of a product type.

13. The system of claim 8, wherein data in the first data storage structure is consumed by end applications.

14. The system of claim 8, wherein the partitioning approach relates to: whether the data is time series data, a data identifier, or a data type.

* * * * *